United States Patent

[11] 3,577,074

| [72] | Inventor | Julius Praglin<br>Beachwood, Ohio |
|---|---|---|
| [21] | Appl. No. | 767,745 |
| [22] | Filed | Oct. 15, 1968 |
| [45] | Patented | May 4, 1971 |
| [73] | Assignee | Keithley Instruments, Inc.<br>Solon, Ohio |

[54] BRIDGE MEASURING CIRCUIT
2 Claims, 1 Drawing Fig.

[52] U.S. Cl. ..................................................... 324/98,
324/65, 324/118, 330/10
[51] Int. Cl. ..................................................... G01r 17/02,
G01r 27/02
[50] Field of Search.......................................... 324/98, 99,
118, 57 (B), 65; 307/251, 304; 330/10;
318/20.750, 20.810

[56] References Cited
UNITED STATES PATENTS

| 3,024,658 | 3/1962 | Huddleston, Jr. ............ | 324/118X |
| 3,454,850 | 7/1969 | Miller........................... | 307/251X |

Primary Examiner—Rudolph V. Rolinec
Assistant Examiner—Ernest F. Karlsen
Attorney—Yount, Flynn and Tarolli ABSTRACT: A measuring circuit is disclosed having a bridge with the input terminals connected to the positive and negative output terminals of a regulated power supply. The difference in potential between the output terminals of the bridge is adapted to be sensed by a null detector having a ground reference terminal provided by the power supply. In the null detector an indicator is connected to the bridge output terminals through an RC coupling network and MOS field-effect devices which are alternately rendered conductive by an oscillator. The polarizing voltage provided by the power supply for the bridge has a common ground with the null detector.

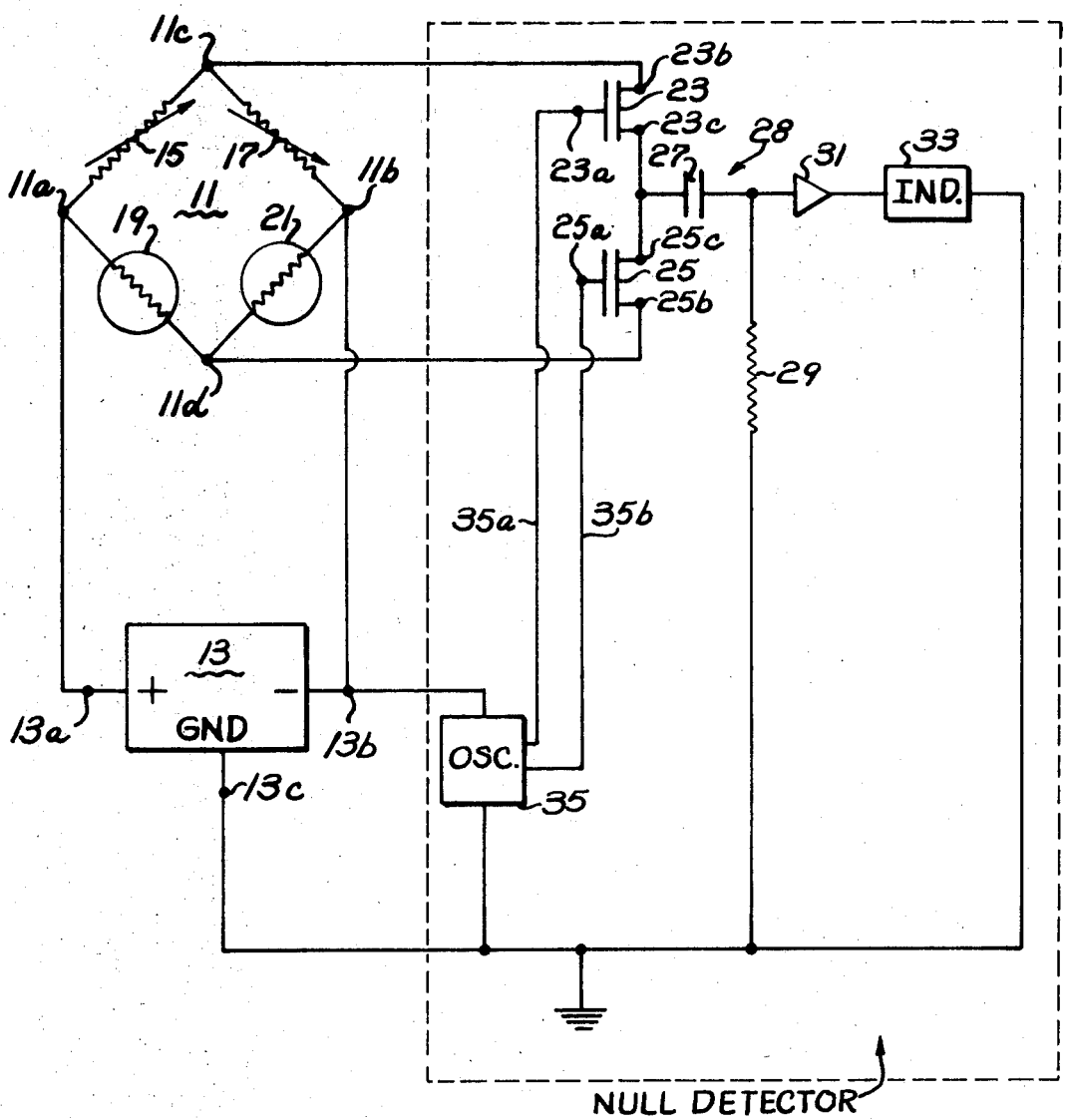

BRIDGE MEASURING CIRCUIT

This invention relates to a high precision bridge measuring circuit.

In making precision measurements with a bridge measuring circuit, it is desirable to use a null detector to which the output terminals of the bridge are alternately connected to indicate a difference in potential therebetween. To obtain accurate measurements, the indicator must be rapidly connected to the opposite bridge terminals by switching means which are reliable in operation and have a substantially low impedance therethrough so as to not cause a voltage drop between the bridge output terminals and the indicator which would interfere with the accuracy of the values measured by the indicator. In addition, it is desirable to use semiconductor switching devices wherein the actuating signals necessary to switch the semiconductor devices between a nonconductive condition and a conductive condition do not introduce errors into the measuring process which substantially affect the accuracy of the values measured by the indicator. Also, it is desirable to provide a much less expensive bridge measuring circuit by operating both the bridge and the switching means from the same power supply.

It is an object of the present invention to provide a bridge measuring circuit including a null detector wherein it is not necessary to provide independent power supplies for the bridge and null detector to provide accurate bridge measurements.

It is a further object of the present invention to provide a bridge measuring circuit, particularly a circuit for measuring low voltages, e.g., millivolts, wherein a null detector includes semiconductor switches which operate to connect the detector to the output terminals of a bridge, with semiconductor switching devices having electrical characteristics such that special techniques are not required to isolate the switch-actuating signals of the null detector from the bridge measuring circuit.

Still other objects and advantages will become apparent to those skilled in the art from the reading of the following description of one physical embodiment in accordance with the invention, taken in conjunction with the accompanying drawing, wherein:

The FIGURE of the drawing shows a schematic diagram of a bridge measuring circuit using semiconductor switches according to the present invention.

Referring now in detail to the drawing, a potential difference is established across a bridge 11 by connecting the input, i.e., power terminals 11a, 11b thereof to the positive and negative output terminals 13a, 13b respectively of a regulated power supply 13. The bridge includes a pair of resistors 15, 17 connected in series between the input terminals 11a, 11b of the bridge to provide the ratio branch of the bridge. A bridge output terminal 11c is connected to a junction between the resistors 15, 17. A second branch of the bridge is connected between the input terminals 11a, 11b of the bridge and in the illustrated embodiment, comprises thermistors 19, 21 connected in series. A bridge output terminal 11d is connected to a junction between the thermistors 19, 21. In the preferred circuit, the resistors 15, 17 have the same resistance and are adjustable to obtain a precise match between the resistances thereof. The thermistors 19, 21 also have the same resistance when at a give temperature and desirably have substantially matched temperature coefficients of resistance. The thermistors may be part of an apparatus such as a chromatograph detector cell, for sensing temperature changes therein, with the thermistor 19 being adapted to sense the temperature changes of adjacent adsorbent material in the cell and the thermistor 21 being adapted to sense the ambient or reference temperature of the fluid in advance of the adsorbent material.

The difference in potential at the output terminals 11c, 11d of the bridge 11 is measured by a null detector ND comprising switching devices 23, 25 which are field-effect transistor devices known as MOS transistors. The terminals 11c, 11d are connected through the source-drain path of the metal oxide semiconductor field-effect devices 23, 25, respectively to one side of a capacitor 27 of a coupling network, generally indicated at 28, forming a part of a voltage measuring circuit including an amplifier 31 and an indicating meter 33. The other side of the capacitor 27 is connected by a resistor 29 to a ground reference terminal 13c of the regulated power supply 13. The coupling network 28 connects the output signal from the bridge to the input of the amplifier 31, the latter being connected to a junction between the capacitor 27 and the resistor 29 of the coupling network 28. The output of the amplifier is applied to the indicator 33 which is connected between the amplifier 31 and the ground reference terminal 13c of the regulated power supply 13.

The MOS field-effect devices 23, 25 desirably provide equal low impedance paths between the bridge output terminals 11c, 11d respectively and the coupling capacitor 27 and do not introduce any significant voltage drop in the signal. The MOS field-effect devices 23, 25 are normally nonconductive, but are adapted to be rendered conductive by the application of a gating signal to the gate electrodes 23a, 25a thereof. In the illustrative embodiment, the MOS field-effect devices have the source electrodes 23b, 25b connected to the bridge output terminals 11c, 11d respectively, and the drain electrodes 23c, 25c connected to the coupling capacitor 27. Negative gating signals are alternately applied to the gate electrodes 23a, 25a of the semiconductor devices 23, 25 by an oscillator 35 connected between the negative and ground reference output terminals 13b, 13c of the regulated power supply 13 and having leads 35a, 35b connected to the gates of the semiconductor devices 23, 25 respectively. The gate electrodes 23a, 25a of the MOS field-effect devices have a very high input impedance, on the order of $10^{16}$ or $10^{17}$ ohms, and accordingly the gating current is so small that its effect on the measuring process may be considered negligible. The MOS field-effect devices 23, 25 have a low impedance source-drain path so as to not cause an appreciable voltage drop thereacross which would interfere with the accuracy of the measurements by the indicator when voltages on the order of 10 millivolts are being measured.

In operation, when the bridge 11 is initially energized by the regulated power supply 13 and the thermistors are at the same temperature, the resistances of the sensing and reference thermistors 19, 21 are substantially equal and the bridge is balanced with the output terminals 11c, 11d having substantially the same potential with respect to the ground reference terminal 13c of the regulated power supply 13. As the oscillator 35 alternately applies gating signals to the MOS field-effect devices 23, 25 to alternately render them conductive and nonconductive, the capacitor 27 is alternately connected to the bridge output terminals 11c, 11d and becomes charged through the resistor 29 to the common potential existing at the bridge output terminals 11c, 11d. Once the capacitor 27 becomes charged to the common potential at the bridge output terminals 11c, 11d and the bridge 11 remains balanced, the coupling network 28 does not pass a signal from the bridge 11 to the indicator 33.

When the temperature of the thermistor 19 undergoes a temperature increase, the resistance of the sensing thermistor 19 decreases, thereby unbalancing the bridge and causing the potential at the bridge output terminal 11d to become greater than the potential at the bridge output terminal 11c. When the capacitor 27 is connected through the MOS field-effect device 25 to the bridge output terminal 11d, the higher potential at the terminal 11d causes a transient current to flow through the capacitor 27 and the resistor 29 which produces a voltage drop across the resistor 29 that is indicative of the potential difference between the bridge output terminals 11d, 11c. This potential difference signal is then amplified by the amplifier 31 and measured by the indicator 33 to indicate the potential unbalance of the bridge 11. When the capacitor 27 is again connected through the MOS field-effect device 23 to the bridge output terminal 11c, the capacitor discharges to the reference potential at the bridge output terminal 11c.

During the operation of the bridge measuring circuit, the gating signals alternately applied to the gate electrodes 23a, 25a of the MOS field-effect devices 23, 25 respectively flow through the serially connected capacitor 27 and resistor 29 to the reference ground terminal 13c of the regulated power supply 13 and produce a voltage drop across the resistor 29. However, due to the high input resistance of the gate electrodes 23a, 25a, the gating signal is very small and only a negligible voltage drop is produced across the resistor 29 which does not affect the accuracy of the values measured by the indicator 33. This high impedance effectively isolates the gating signals from the indicator so that it is not necessary to use special techniques, such as independent power supplies for the null detector and the bridge circuit, to prevent undesirable interaction between the bridge power circuit and the null detecting circuit.

While the invention has been illustrated and described with respect to a single embodiment, it is also useful in bridges other than those employing thermistor sensing elements. For example, other sensing devices which undergo a change in electrical impedance as a result of external conditions could be used besides thermistors or the element being measured could be affixed to an unknown connected into the bridge. Also, the thermistor 21 could be used to sense the temperature changes instead of the thermistor 19 and the MOS field-effect devices could have a common source connection instead of a common drain connection at the coupling capacitor 27.

Having described the preferred embodiments of the present invention, I claim the following and equivalents thereof as my invention:

I claim:

1. A voltage measuring circuit comprising a bridge having output terminals which have the same potential when said bridge is balanced, a null detector connected to said output terminals, and a single power supply means for said null detector and for polarizing said bridge, said null detector comprising a voltage sensing circuit and means for connecting said voltage sensing circuit to said output terminals including semiconductor switching means and gate means for rendering said semiconductor switching means conductive to energize said voltage measuring circuit from said bridge through a path including said semiconductor switching means, gating circuit means for applying a gating signal to said gate means, said gate means having a high input impedance which effectively isolates said gating circuit means from said path whereby the power supply for said bridge and said null detector are not independent of each other, said semiconductor switching means including a pair of MOS field-effect transistors each having a gate electrode comprising said gate means, said oscillating circuit connected to the gate electrodes of said MOS field-effect transistors to render the latter alternately conductive to alternately connect said null detector to different ones of said terminals to enable said voltage measuring circuit to alternately sense the potential of said output terminals, said null detector and said bridge having a common ground.

2. A voltage measuring circuit according to claim 1, wherein said bridge includes at least one thermistor connected in at least one of the branches thereof, said null detector being adapted to sense a balanced condition of said bridge and further comprising a coupling circuit means connecting said voltage sensing circuit to said semiconductor switching means, said coupling circuit means being a resistance-capacitance coupling network connected to said common ground.